(No Model.)
T. F. TIMBY.
NUT LOCK.
No. 256,767.  Patented Apr. 18, 1882.
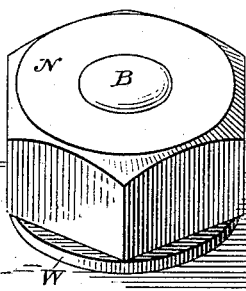
Fig. 1,
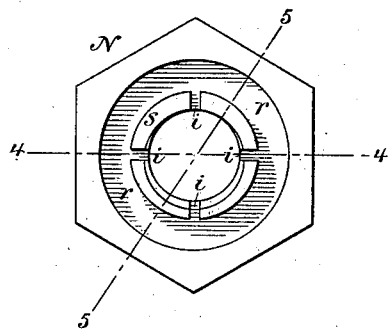
Fig. 2,
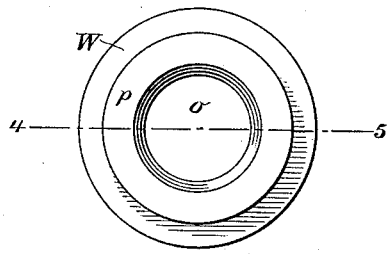
Fig. 3,
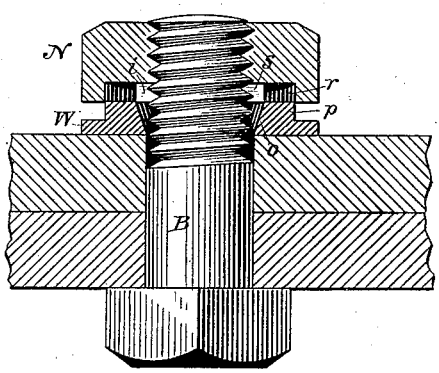
Fig. 4,
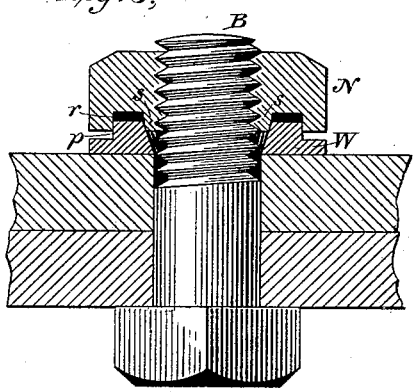
Fig. 5,
WITNESSES
Wm A. Skinkle
Geo W. Breck
INVENTOR.
Theodore F. Timby,
By his Attorney
Geo. L. Ewin.

UNITED STATES PATENT OFFICE.

THEODORE F. TIMBY, OF ALMA, MICHIGAN.

NUT-LOCK.

SPECIFICATION forming part of Letters Patent No. 256,767, dated April 18, 1882.

Application filed February 11, 1882. (No model.)

*To all whom it may concern:*

Be it known that I, THEODORE F. TIMBY, a citizen of the United States, residing at Alma, in the county of Gratiot, Michigan, have invented a new and useful Improvement in Nut-Locks, of which the following is a specification.

This invention relates to improvements in the construction of nuts and washers for screw-bolts, and more particularly those of locomotives and other steam-engines and heavy machinery, with reference to securing the nuts against working loose under the jarring incident to the motion of the machinery.

Various forms of self-locking nuts and locking-washers have heretofore been devised; but for the particular use above named ordinary nuts with superposed jam-nuts are still commonly employed.

My present invention consists in a screw-nut and a locking-washer therefor, adapted for application to an ordinary bolt and to present externally the ordinary appearance of a single nut of given style with its washer, the two coacting in a peculiar manner to securely lock the nut on the bolt without the aid of any auxiliary parts or extraneous means, while they provide for unscrewing or turning back the nuts by the application of sufficient force in the proper direction, and for repeatedly locking the nut by the same means, and without marring the exterior of the nut or washer or any injury whatever to the bolt, as hereinafter more fully set forth.

In the accompanying drawings, Figure 1 is a perspective view of my self-locking nut and washer on a bolt. Fig. 2 is a back view of the nut removed. Fig. 3 is a face view of the washer. Fig. 4 is an axial section of the nut and washer on a bolt, but untightened; and Fig. 5 is a view similar to Fig. 4, showing the nut locked.

Like letters of reference indicate corresponding parts in the several figures.

In carrying out my invention I propose to fit any given ordinary screw-bolt, B, in any location where an ordinary nut and washer could be used with a self-locking nut, N, and washer W of novel construction, but presenting externally substantially the appearance of an ordinary nut and washer, as shown by Fig. 1. Both may be made of any metal ordinarily used, and may be finished in the finest style, while they may be produced cheaply enough to be finished plainly for common use.

The nut N, as shown in Figs. 2, 4, and 5, has in its back an annular recess, $r$, concentric with the central orifice of the nut and having substantially perpendicular walls. An internal collar, $s$, is thus formed integral with the body of the nut, and this collar is divided into four (or it may be more or less) parts by radial indentations $i$. Said recess and indentations may be readily formed at the forging or casting operation of the process of manufacture, which forms no part of the present invention, and the nut may be tapped in customary manner, no peculiarity of screw-thread being requisite.

The washer W, as shown in Figs. 3, 4, and 5, is constructed with a circular portion, $p$, of nearly the same outer diameter as the said recess $r$, and having a cylindrical, or nearly cylindrical, periphery matching the outer wall of said recess, and is further constructed with a central orifice, $o$, having an inclined or beveled wall, which is the internal surface of the washer and coacts with the said collar $s$.

The operation of locking the nut is clearly illustrated by Figs. 4 and 5. As the nut is screwed home the extreme face of the washer, being that of the said portion $p$, enters the nut-recess $r$, which it fits snugly, as indicated in Fig. 4. Another turn or part turn of the nut drives the collar $s$ into a portion of the tapering washer-orifice $o$ having a smaller diameter, and by a wedging action contracts the said collar $s$ around the bolt, as shown in Fig. 5, securely locking the nut against accidentally unscrewing. At the same time the said washer portion $p$ becomes tightly embraced by the solid outer portion of the nut, and the tendency to burst or spread the washer is thus effectually resisted. The nut is unscrewed like an ordinary nut, requiring simply the application of more force; and the same nut and washer may be used repeatedly, while the bolt is not in the least impaired by locking and unlocking the nut.

The external shape of the nut and washer and the circular shape of the nut-recess and the matching washer portion are not material; but the latter is preferred, as it allows the nut to turn on the washer in customary manner.

Having thus described my said invention, I claim as new and of my invention—

A nut constructed with an annular recess in its back, an internal collar integral with the body of the nut, and radial indentations dividing said collar, substantially as herein specified, jointly with a washer having a portion adapted to be tightly embraced by the outer wall of said recess and a tapering central orifice adapted to embrace said collar for contracting the latter around the bolt, substantially as herein specified, for the purposes set forth.

THEODORE F. TIMBY.

Witnesses:
 JAS. L. EWIN,
 HY. A. LAMB.